United States Patent
Dallesasse et al.

(10) Patent No.: US 8,718,484 B2
(45) Date of Patent: May 6, 2014

(54) LASER OPTICAL TRANSMISSION SYSTEM WITH DUAL MODULATION

(75) Inventors: John Dallesasse, Geneva, IL (US); John Iannelli, San Marino, CA (US); Daniel McGlynn, Albuquerque, NM (US)

(73) Assignee: Emcore Corporation, Albuquerque, NM (US)

( * ) Notice: Subject to any disclaimer, the term of this patent is extended or adjusted under 35 U.S.C. 154(b) by 1343 days.

(21) Appl. No.: 11/932,374

(22) Filed: Oct. 31, 2007

(65) Prior Publication Data

US 2009/0110408 A1    Apr. 30, 2009

(51) Int. Cl.
    *H04B 10/04*    (2011.01)
    *H04B 10/12*    (2011.01)
(52) U.S. Cl.
    USPC ........... 398/185; 398/182; 398/183; 398/186; 398/188
(58) Field of Classification Search
    USPC ................................................ 398/182–201
    See application file for complete search history.

(56) References Cited

U.S. PATENT DOCUMENTS

| | | | | |
|---|---|---|---|---|
| 5,430,569 | A * | 7/1995 | Blauvelt et al. | 398/199 |
| 6,252,693 | B1 * | 6/2001 | Blauvelt | 398/194 |
| 6,445,476 | B1 * | 9/2002 | Kahn et al. | 398/189 |
| 6,535,315 | B1 * | 3/2003 | Way et al. | 398/182 |
| 6,545,785 | B1 | 4/2003 | Heflinger et al. | |
| 6,556,327 | B1 * | 4/2003 | Ohya et al. | 398/198 |
| 6,559,994 | B1 * | 5/2003 | Chen et al. | 398/182 |
| 7,603,037 | B2 | 10/2009 | Sayyah | |
| 2002/0067883 | A1 * | 6/2002 | Lo | 385/24 |
| 2002/0101640 | A1 * | 8/2002 | Snawerdt | 359/183 |
| 2002/0129379 | A1 * | 9/2002 | Levinson et al. | 725/129 |
| 2003/0198478 | A1 * | 10/2003 | Vrazel et al. | 398/183 |
| 2005/0025504 | A1 * | 2/2005 | Huang et al. | 398/202 |
| 2006/0210282 | A1 * | 9/2006 | Iannelli | 398/186 |
| 2007/0206961 | A1 * | 9/2007 | Iannelli | 398/188 |
| 2008/0273874 | A1 * | 11/2008 | Ramachandran et al. | 398/43 |

* cited by examiner

*Primary Examiner* — Daniel Dobson

(57) ABSTRACT

An optical transmitter for generating a modulated optical signal for transmission over dispersive fiber optic links in which a first information-containing radio frequency signal input is applied to a modulation circuit for directly modulating a semiconductor laser with the signal input. The output of the laser is applied to a phase modulator to which a second information-containing radio frequency signal is applied.

17 Claims, 4 Drawing Sheets

LASER OPTICAL TRANSMISSION SYSTEM WITH DUAL MODULATION

REFERENCE TO RELATED APPLICATIONS

This application is related to U.S. patent application Ser. No. 10/946,056 filed Sep. 21, 2004, now U.S. Pat. No. 7,412,174, and assigned to the common assignee.

BACKGROUND OF THE INVENTION

1. Field of the Invention

This invention relates to an optical transmission system for analog or digital signals, and in particular to a directly modulated solid-state laser. More particularly, the invention relates to the use of chirp modulation using an external modulator to increase the data rate of the optical signal.

2. Description of the Related Art

Directly modulating the analog intensity of a light-emitting diode (LED) or semiconductor laser with an electrical signal is considered among the simplest methods known in the art for transmitting analog signals, such as voice and video signals, on optical fibers. Although such analog transmission techniques have the advantage of substantially smaller bandwidth requirements than digital transmission, such as digital pulse code modulation, or analog or pulse frequency modulation, the use of amplitude modulation may suffer from noise and nonlinearity of the optical source.

For that reason, direct modulation techniques have been used in connection with 1310 nm lasers where the application is to short transmission links that employ fiber optic links with zero dispersion. For applications in metro and long haul fiber transmission links, the low loss of the link requires that externally modulated 1550 nm lasers be used, but such external modulation techniques are complex and expensive.

Direct modulation of lasers at 1550 nm is known for use in digital optical transmission systems such as dense wavelength division multiplexing (DWDM) systems. See, for example, Kartalopoulos, DWDM Networks, Devices, and Technology (IEEE Press, 2002).

One of the issues in designing systems at 1550 nm is that suitable low chirp lasers for use at 1550 nm are not known in the prior art. One type of low chirp laser is the external cavity laser, which is used in digital optical transmission systems, and is a commercially available product. In addition to the low chirp characteristics required for an analog optical transmission system at 1550 nm, the system must be highly linear. Distortion inherent in the operating characteristics of semiconductive lasers prevents a linear electrical modulation signal from being converted linearly to an optical signal, and instead causes the signal to become non-linear or distorted. These effects are particularly detrimental to multi-channel video transmission, which requires excellent linearity to prevent channels from interfering with each other. A highly linearized analog optical system has wide application in commercial analog systems, such as broadcast TV transmission, CATV, interactive TV, and video telephone signal transmission.

The increasing demand for higher data rates and greater throughput in optical fiber networks has created increased attention on a variety of techniques to modulate and encode digital data signals for transmission on optical fiber. One technique called wavelength division multiplexing (WDM) is the use of multiple wavelengths to carry multiple signal channels and thereby greatly increase the capacity of transmission of optical signals over the installed fiber optic networks. See, for example, Kartalopoulos, DWDM Networks, Devices, and Technology (IEEE Press, 2002).

In a WDM optical system, light from several lasers, each having a different central wavelength, is combined into a single beam that is introduced into an optical fiber. Each wavelength is associated with an independent data signal through the optical fiber. At the exit end of the optical fiber, a demultiplexer is used to separate the beam by wavelength into the independent signals. In this way, the data transmission capacity of the optical fiber is increased by a factor equal to the number of single wavelength signals combined into a single fiber.

In the optical transceiver, demultiplexing devices are typically designed to selectively direct several channels from a single multi-channel input beam into separate output channels. Multiplexing devices are typically designed to provide a single multi-channel output beam by combining a plurality of separate input beams of different wavelengths. A multiplexing/demultiplexing device operates in either the multiplexing or demultiplexing mode depending on its orientation in application, i.e., depending on the choice of direction of the light beam paths through the device.

In prior art WDM systems, data carrying capacity may be increased by adding optical channels. Conceptually, each wavelength channel in an optical fiber operates at its own data rate. In fact, optical channels can carry signals at different speeds. In current commercial systems, the use of WDM can push total theoretical capacity per fiber to 160 channels at 25 GHz channel spacing, or 1.6 terabits per second (1.6 tbps). Generally, more space is required between wavelength channels when operating at 10 per second than at 2.5 per second, but the total capacities are nonetheless impressive. For example, in the case of four wavelength channels at a data rate per channel of 2.5 Gigabits per second, a total rate of 10 Gigabits per second is provided. Using eight wavelength channels at a data rate per channel of 2.5 Gigabits per second, a total data rate of 20 Gigabits per second is attained. In fact, other wavelength channels can include, for example, 16, 32, 40 or more wavelength channels operating at 2.5 Gigabits per second or 10 Gigabits per second and allow much higher data throughput possibilities. Furthermore, it is also known in the prior art to use multiple optical fibers in a single cable or conduit can provide even higher transmission rates in a point to point link.

Although high throughput telecommunications networks do not constrain the size of the optical transceiver, optical transceivers for data center applications that use the Ethernet data communications protocol generally conform to IEEE 802.3 standard specifications and MSA form factors. Ethernet (the IEEE 802.3 standard) is the most popular data link network protocol. The Gigabit Ethernet Standard (IEEE 802.3) was released in 1998 and included both optical fiber and twisted pair cable implementations. The 10 Gb/sec Ethernet standard (IEEE 802.3 ae) was released in 2002 with both optical fiber and twisted pair cabling.

The 10 Gigabit Ethernet Standard specifications are set forth in the IEEE 802.3 ae supplement to the IEEE 802.3 Ethernet Standard are currently the highest data rate that has been standardized under the IEEE 802.3 framework. The supplement extends the IEEE 802.3 protocol and MAC specification therein to an operating speed of 10 Gb/s. Several Physical Coding Sublayers known as 100GBASE-X, 10GBASE-R and 10-GBASE-W are specified, as well as a 10 Gigabit Media Independent Interface (XGMII), a 10 Gigabit Attachment Unit Interface (XAUI) and a 10 Gigabit Sixteen-Bit Interface (XSBI) and management Regardless of whether the system provides for one optical channel, or a WDM system with multiple optical channels, there is interest in increasing the information carrying capacity of an optical channel. Although various techniques such as PAM and QAM are known in the prior art, it has not been known to utilize the jitter or inherent chirp associated with the transmitter to carry an additional information channel or bit.

Prior to the present invention, there has not been an application of an external modulator coupled to the monitor to the output of a directly (current) modulated laser for the purpose of modifying the chirp with an information-containing signal.

SUMMARY OF THE INVENTION

1. Objects of the Invention

It is an object of the present to provide high data rate optical transmission system using a directly modulated laser.

It is another object of the present invention to provide amplitude and frequency modulation of the output of a laser to carry two independent information-containing signals.

It is also another object of the present invention to provide a direct modulation and external modulation of a laser to increase the data rate of the optical output signal.

2. Features of the Invention

Briefly, and in general terms, the present invention provides an optical transmitter for generating a modulated optical signal for transmission over a dispersive fiber optic link to a remote receiver including: an input for receiving a first information-containing radio frequency signal input; a semiconductor laser coupled to the input and producing an output optical signal; and a phase modulator have an input coupled to the output of the semiconductor laser and function to modulate the optical signal with a second information-containing signal to produce a composite optical signal to be transmitted over the fiber optic link.

Additional objects, advantages and novel features of the present invention will become apparent to those skilled in the art from this disclosure, including the following detail description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

Some implementations may achieve fewer than all of the foregoing objects.

BRIEF DESCRIPTION OF THE DRAWINGS

These and other features and advantages of this invention will be better understood and more fully appreciated by reference to the following detailed description when considered in conjunction with the accompanying drawings, wherein.

Some implementations may incorporate or implement fewer of the aspects or features noted in the foregoing summaries.

Figure 1A:
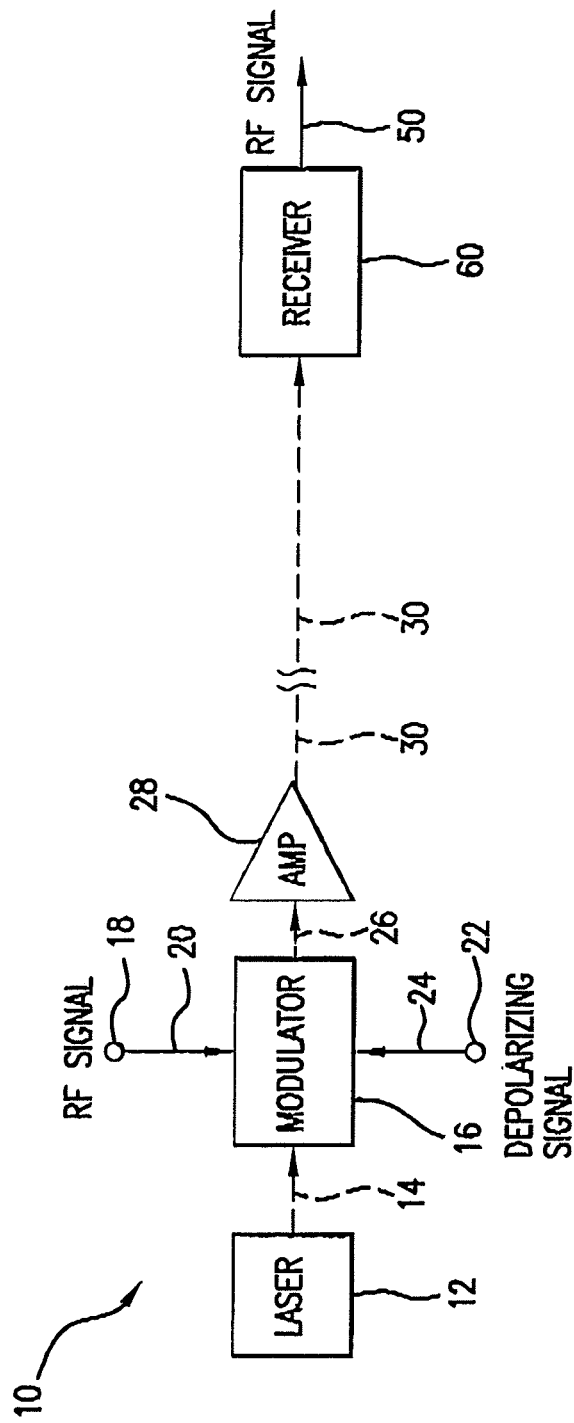
FIG. 1(a) is a highly simplified block diagram of an directly modulated optical transmission system using a pre-distortion circuit as known in the prior art.

The novel features and characteristics of the invention are set forth in the appended claims. The invention itself, however, as well as other features and advantages thereof, will be best understood by reference to a detailed description of a specific embodiment, when read in conjunction with the accompanying drawings.

DETAILED DESCRIPTION OF THE PREFERRED EMBODIMENT

Details of the present invention will now be described, including exemplary aspects and embodiments thereof. Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of actual embodiments nor the relative dimensions of the depicted elements, and are not drawn to scale.

FIG. 1(a) is block diagram of a prior art optical transmitter as represented in U.S. Pat. No. 5,699,179 utilizing an external modulator. The transmitter, shown generally at 10, transmits an optical signal to a receiver 60 over an optical fiber path 30. The transmitter 10 includes a semiconductor laser 12 which produces a continuous wave (CW) output. Typical examples of such lasers are distributed feedback (DFB) laser or Fabry-Perot lasers that produce an output optical beam at a wavelength of 1550 nm. The unmodulated optical signal from the laser is coupled to a modulator 16 by optical fiber 14. The modulator 16 may be a single modulator such as a Mach-Zehnder (MZ) modulator, a cascaded MZ modulator or more than one modulator such as in a feed-forward linearizer. The modulator 16 also receives, via terminal 18 and line 20, an information-containing broadband RF signal, such as an amplitude modulated vestigial sideband (AM-SDB) cable television (CATV) or video signal, or a digital signal. Moreover, when a feed-forward linearizer is used, a depolarizing signal is provided to the modulator 16 via terminal 22 and line 24. The depolarizing signal is used to depolarize the optical input to an error-correcting modulator (not shown) in the modulator 16.

The modulated optical signal which carries the video data is coupled by a fiber link 26 to an amplifier 28. The amplifier 28 is typically an erbium doped fiber amplifier (EDFA). The amplified optical signal is coupled to a fiber optical transmission line 30 to the receiver 60. The optical fiber transmission line 30 may be a long-distance link extending over several kilometers. In this case, line amplifiers such as EDFA 28 may be provided at spaced intervals along in the line in order to boost the signal to desired levels. At the receiver 60, an amplifier (not shown) may also be provided to boost the incoming optical signal. The boosted signal is then applied to a photodector and demodulated at the receiver 60 to an electrical signal, which represents the original video or data signal at line 50.

Figure 1B:
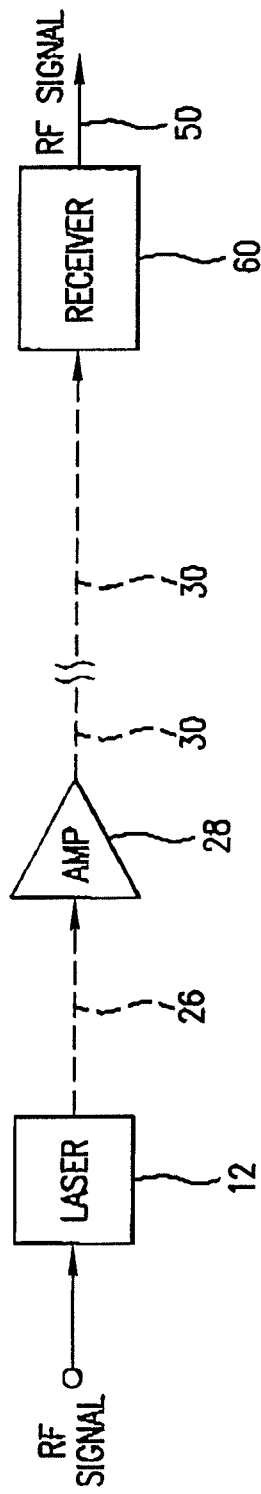
FIG. 1(b) is a highly simplified block diagram of an directly modulated optical transmission system using a pre-distortion circuit as known in the prior art.

FIG. 1(b) is a block diagram of another type of prior art optical transmitter that utilizes direct current modulation of the laser. The broadband RF analog or digital signal is applied directly to the laser 12. The modulated optical signal from the laser 12 is coupled by a fiber link 26 to an amplifier 28, such as an EDFA. The amplified optical signal is coupled to a fiber transmission line 30 to the receiver 60. At the receiver, the optical signal is converted to an electrical signal, representing the original video or data signal at line 50.

Figure 2:
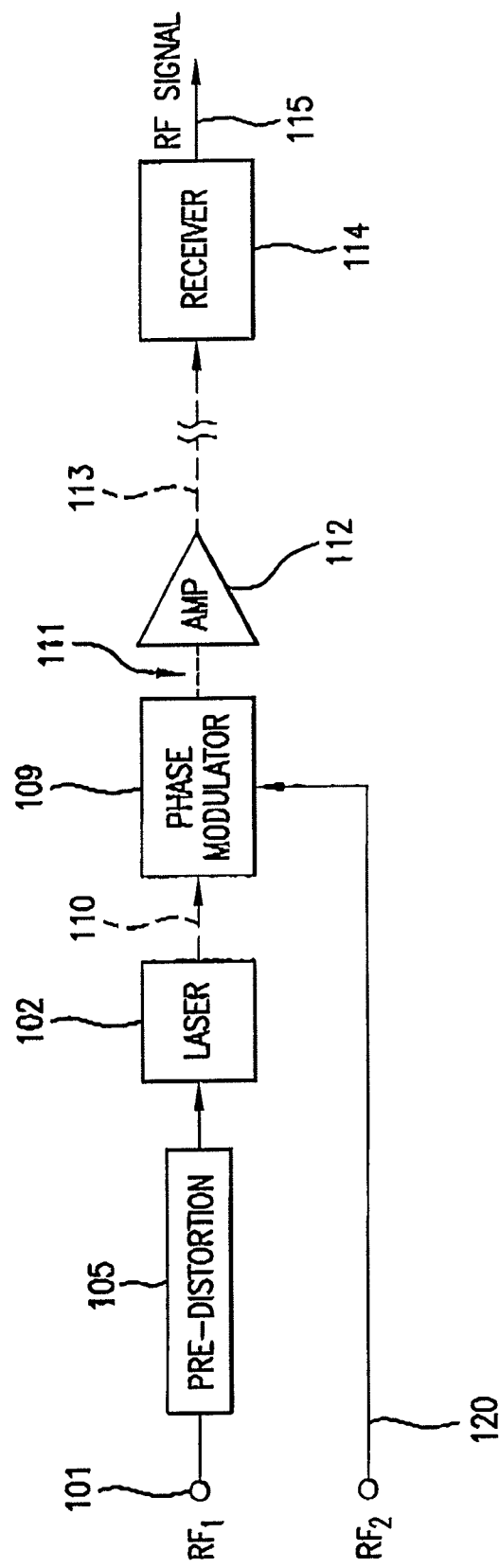
FIG. 2 is a highly simplified block diagram of the optical transmission system according to a first embodiment of the present invention.

FIG. 2 is a highly simplified block diagram of the optical transmission system 100 according to a first embodiment of the present invention. There are shown first and second RF signal input sources $RF_1$ and $RF_2$, respectively, such as a broadband signal including a plurality of distinct information-containing communications signals or channels. The $RF_1$ input is applied to RF conditioning circuitry such as a pre-distortion circuit 105 as will be described in more detail below. The pre-distortion circuit 105 provides an output signal to a DC laser driver or control circuit, which is applied to the laser 102. The laser is current modulated, so that an amplitude modulated optical signal representing the $RF_1$, signal is coupled to fiber link 110. Fiber link 110 is input to phase modulator 109. The modulator 109 may be a lithium niobate phase modulator, a piezoelectric phase modulator, or an electroabsorption modulator.

The second RF signal input source labeled as $RF_2$, is applied directly to the phase modulator 109. In this first embodiment of the present invention, the information-containing communication channels are divided into two groups: the first group containing channels 1 through M is applied to the laser 102 to directly amplitude modulate the laser; the second group of channels M+1 through N is applied to the phase modulator 109, to modulate the chirp of the laser. Since the amplitude modulation and the chirp or jitter modulation are independent, the result is that the resulting amplitude and jitter modulated optical signal output from the phase modulator 109 will carry a N information-containing channels.

In one implementation of the above embodiment, the jitter modulated optical signal may be limited to carrying a single "control" channel, as opposed to carrying "data." The control channel may be used to transfer operational data concerning the transmitter or transceiver with which it is associated, or to provide instructions or commands to a remote module to which the communications link is attached, or error correction data associated with the data stream sent by the amplitude modulated optical signal.

Optical fiber transmission line 113 may be a long-distance link extending over several kilometers. In this case, line amplifiers such as EDFAs may be provided at spaced intervals along in the line in order to boost the signal to desired levels. At the receiver 114, an amplifier (not shown) may also be provided to boost the incoming optical signal. The boosted signal is then applied to a photodetector and demodulated at the receiver 114 to an electrical signal, which represents the original video or data signal at line 115.

Figure 3:
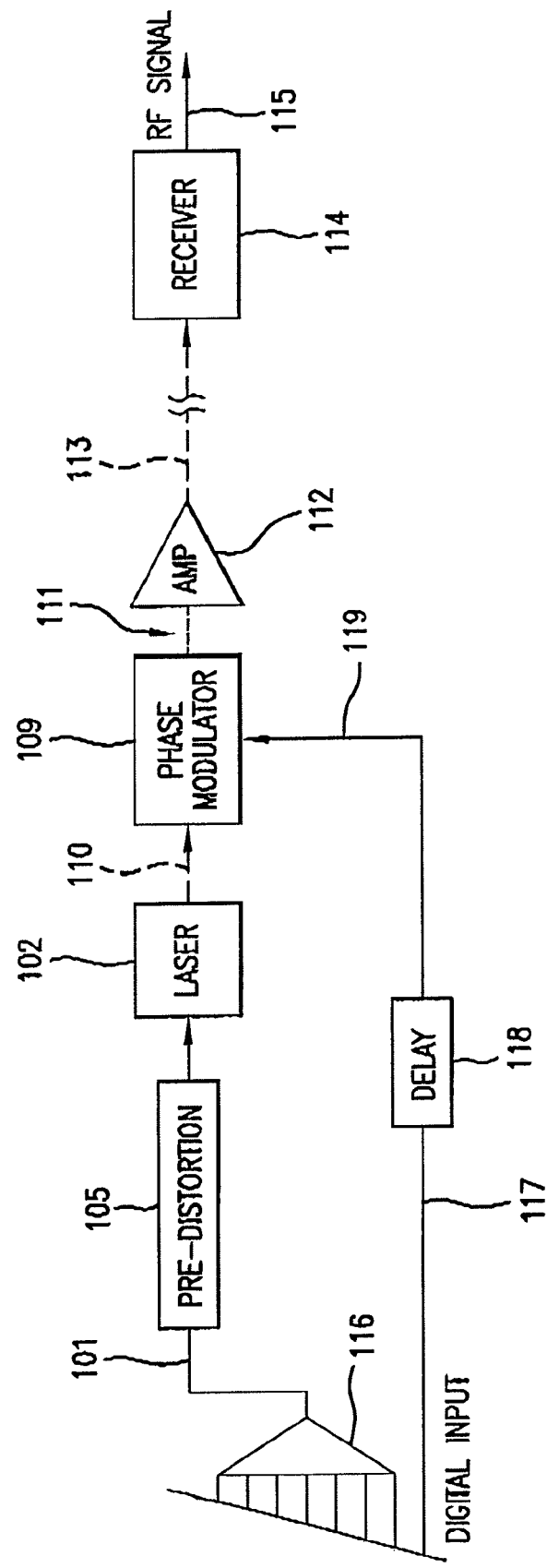
FIG. 3 is a highly simplified block diagram of the optical transmission system according to a second embodiment of the present invention.

FIG. 3 depicts a second embodiment of the present invention, in which the information-containing communications signal is a digital signal transferred as 8-bit bytes, are divided into two groups: the first group containing bits 0 through 6 is applied a multiplexer or encoder 11b to the laser to directly amplitude modulate the laser.

The second group, consisting solely of bit 7 of the 8-bit byte, is applied also to a suitable delay circuit 118, and then the phase modulator so that the optical signal modulated with bits 0-6 is phase modulated with bit 7. The resulting optical signal is amplitude modulated with bits 0-6, and chirp or phase modulated with bit 7. Since the amplitude modulation and the chirp or jitter modulation are independent, the result is that the amplitude and jitter modulated optical signal output at optical link 111 will carry an 8-bit information byte.

Another embodiment of the present invention is to utilize the first and second information containing signals to separately apply to the amplitude and phase modulation components of a transmitted symbol. In normal quadrature amplitude modulation, a single information containing signal is encoded into a QAM symbol, which then is electrically implemented by appropriate amplitude and phase modulation of the carrier for each respective symbol. The present embodiment has two independent information containing signals, which separately and independently modulate the amplitude and phase, respectively, of the carrier. What is transmitted may appear to be a QAM symbol, but since the encodation is different a normal QAM decoder would not be able to decode the received signal into the source data. Rather, one must utilize a customized QAM symbol decoder to separate the amplitude and phase components into two different channels, which represent the two independent source data streams, in order to intelligibly decode the data.

In still other embodiments utilizing QAM encoding and transmission, the first high data rate information-containing signal or channel may be encoded into QAM symbols, and the second low data rate information-containing signal may modulate the "jitter" associated with one or more of the QAM symbols which encodes the first information channel.

Other variants of such embodiments will be apparent to those skilled in the art, and are intended to be encompassed with the scope of the present invention.

Various aspects of the techniques and apparatus of the present invention may be implemented in digital circuitry, or in computer hardware, firmware, software, or in combinations of them. Circuits of the invention may be implemented in computer products tangibly embodied in a machine-readable storage device for execution by a programmable processor, or on software located at a network node or web site which may be downloaded to the computer product automatically or on demand. The foregoing techniques may be performed by, for example, a single central processor, a multiprocessor, one or more digital signal processors, gate arrays of logic gates, or hardwired logic circuits for executing a sequence of signals or program of instructions to perform functions of the invention by operating on input data and generating output. The methods may advantageously be implemented in one or more computer programs that are executable on a programmable system including at least one programmable processor coupled to receive data and instructions from, and to transmit data and instructions to, a data storage system, at least one in/out device, and at least one output device. Each computer program may be implemented in a high-level procedural or object-oriented programming language, or in assembly or machine language if desired; and in any case, the language may be compiled or interpreted language. Suitable processors include, by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specially designed application-specific integrated circuits (ASICS).

It will be understood that each of the elements described above, or two or more together, also may find a useful application in other types of constructions differing from the types described above.

While the invention has been illustrated and described as embodied in an optical transmission system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

The invention claimed is:

1. An optical transmitter for generating a composite modulated optical signal for transmission over a fiber optic link to a remote receiver comprising:
    a data source for outputting an information-containing signal of an M-bit bytes, where M is a positive integer;
    an encoder coupled to the data source for separating each byte received from the data source into a first digital signal representing the first K bits of the M-bit byte, and a second digital signal representing the remaining M-K bits of each M-bit byte, where K is a positive integer less than M;
    a semiconductor laser coupled to said encoder for receiving the first digital signal representing said first K bits of said M-bit byte and configured to be directly modulated by said first K bits of said M-bit byte to produce a modulated output optical signal; and
    a phase modulator electrically coupled to said encoder for receiving said second digital signal and having an optical input coupled to an output of the semiconductor laser and operative to phase modulate the modulated output optical signal with the second digital signal representing the remaining (M-K) bits of each said M-bit byte to produce a composite modulated optical signal representing the information-containing signal.

2. A transmitter as defined in claim 1 wherein phase modulation by the phase modulator modulates a jitter associated with the first digital signal.

3. A transmitter as defined in claim 1, further comprising a delay element disposed between the encoder and the phase modulator for synchronizing arrival of the first digital signal, which is modulated by the semiconductor laser, with arrival of the second digital signal at the phase modulator.

4. A transmitter as defined in claim 1, wherein the laser is an external cavity laser.

5. A transmitter as defined in claim 1, wherein the wavelength of the light output of the laser is in the 1530 to 1570 nm range.

6. An optical transmitter for generating a composite modulated optical signal from first and second independent information-containing signals for transmission over a fiber optic link to a remote receiver where the first and second information containing signals are to be reconstructed, comprising:
    a first information-containing signal source having a data rate and including a first plurality of distinct information-containing communications channels encoded into quadrature amplitude modulation (QAM) symbols;
    a second information-containing signal source having a lower data rate than the first information-containing signal source and including a second plurality of information-containing communications channels;
    a semiconductor laser coupled to said first information-containing signal source and configured to be directly modulated by said first information-containing signal source to produce a modulated output optical signal; and
    a phase modulator electrically coupled to the second information signal source and having an optical input coupled to an output of the semiconductor laser and operative to phase modulate the modulated optical signal with the second information signal source to produce a composite modulated optical signal encoding QAM symbols representing the first information-containing signal and having a phase jitter encoding the second information-containing signal, to be transmitted over said fiber optic link, wherein the first and second plurality of information containing channels are reconstructed at said remote receiver.

7. An optical transmitter as defined in claim 6, further comprising a predistortion circuit coupled between the first information-containing signal and the semiconductor laser for reducing the distortion in the signal present at the receiver end of the fiber optic link.

8. A transmitter as defined in claim 6, wherein the laser is an external cavity laser.

9. A transmitter as defined in claim 6, wherein the wavelength of the light output of the laser is in the 1530 to 1570 nm range.

10. A transmitter as defined in claim 6, further comprising a delay element disposed between the second information-containing signal source and the phase modulator for synchronizing the arrival of the first information-containing signal with the arrival of the second information-containing signal at the phase modulator.

11. A transmitter as defined in claim 6, wherein the first information-containing signal is a broadband video signal.

12. A transmitter as defined in claim 6, wherein the phase modulator is a lithium niobate phase modulator.

13. A transmitter as defined in claim 6, wherein the phase modulator is a piezoelectric phase modulator.

14. A transmitter as defined in claim 6, wherein the phase modulator is an electro absorption modulator.

15. A method for generating a composite modulated optical signal from information-containing signals for transmission over a fiber optic link to a remote receiver where the information-containing signals are to be reconstructed, the method comprising:
    providing a broadband radio frequency (RF) first information signal source including a first plurality of distinct information-containing communications channels, wherein at least one of the first plurality of distinct information-containing communications channels is a quadrature amplitude modulation (QAM) encoded signal;
    providing a second information signal source including a second plurality of information containing communications channels different from the first plurality of distinct information containing communications channels;
    directly modulating a semiconductor laser coupled to said first information signal source for receiving a first information-containing signal to produce a modulated output optical signal; and
    providing a phase modulator electrically coupled to the second information signal source and having an optical input coupled to an output of the semiconductor laser and operative to phase modulate the modulated optical signal with the second information signal source to produce a composite modulated optical signal to be transmitted over said fiber optic link, the phase modulation including modulating a jitter associated with the QAM encoded symbols with at least one of the second plurality of information-containing channels, wherein the first and second plurality of information-containing communications channels are reconstructed at said remote receiver.

16. A method for generating a composite modulated optical signal from information-containing signals for transmission over a fiber optic link to a remote receiver where the information-containing signals are to be reconstructed, the method comprising:

providing a broadband radio frequency (RF) first information signal source including a first plurality of distinct information-containing communications channels;

providing a second information signal source including a second plurality of information containing communications channels different from the first plurality of distinct information containing communications channels;

directly modulating a semiconductor laser coupled to said first information signal source for receiving a first information-containing signal to produce a modulated output optical signal;

providing a phase modulator electrically coupled to the second information signal source to receive a second information-containing signal, the phase modulator having an optical input coupled to an output of the semiconductor laser and operative to phase modulate the modulated optical signal with the second information signal source to produce a composite modulated optical signal to be transmitted over said fiber optic link; and delaying arrival of the second information-containing signal at the phase modulator to synchronize the second information-containing signal with arrival of the broadband RF signal, wherein the first and second plurality of information-containing communications channels are reconstructed at said remote receiver.

17. A method for generating a composite modulated optical signal from information-containing signals for transmission over a fiber optic link to a remote receiver where the information-containing signals are to be reconstructed, the method comprising:

providing a broadband radio frequency (RF) first information signal source including a first plurality of distinct information-containing communications channels;

providing a second information signal source including a second plurality of information containing communications channels different from the first plurality of distinct information containing communications channels;

directly modulating a semiconductor laser coupled to said first information signal source for receiving a first information-containing signal to produce a modulated output optical signal;

and providing a phase modulator electrically coupled to the second information signal source to receive a second information-containing signal, the phase modulator having an optical input coupled to an output of the semiconductor laser and operative to phase modulate the modulated optical signal with the second information signal source to produce a composite modulated optical signal to be transmitted over said fiber optic link; and synchronizing arrival of the second information-containing signal at the phase modulator with arrival of the broadband RF signal, wherein the first and second plurality of information-containing communications channels are reconstructed at said remote receiver.

* * * * *